United States Patent [19]
Wugofski

[11] Patent Number: 6,003,041
[45] Date of Patent: Dec. 14, 1999

[54] METHOD AND MANAGING MULTIPLE CHANNEL MAPS FROM MULTIPLE INPUT DEVICES IN A MULTIMEDIA SYSTEM

[75] Inventor: Theodore D. Wugofski, Fort Worth, Tex.

[73] Assignee: Gateway 2000, Inc., North Sioux City, S. Dak.

[21] Appl. No.: 09/002,762

[22] Filed: Jan. 5, 1998

[51] Int. Cl.[6] .................................................. G06F 17/30
[52] U.S. Cl. ............................... 707/104; 707/10; 707/4; 348/24; 370/464; 455/450
[58] Field of Search .............................. 707/1, 104, 200, 707/4, 10; 370/464; 348/24; 455/450, 464

[56] References Cited

U.S. PATENT DOCUMENTS

| | | | |
|---|---|---|---|
| 4,060,849 | 11/1977 | Bienvenu et al. | 710/38 |
| 4,188,662 | 2/1980 | Ishibashi | 711/207 |
| 4,435,755 | 3/1984 | Meritt | 710/38 |
| 4,459,661 | 7/1984 | Kaneda et al. | 709/100 |
| 4,527,194 | 7/1985 | Sirazi | 348/11 |
| 5,020,129 | 5/1991 | Martin et al. | 455/4.2 |
| 5,257,106 | 10/1993 | Maruoka | 358/191.1 |
| 5,394,560 | 2/1995 | Kane | 455/12.1 |
| 5,546,396 | 8/1996 | Clauzel et al. | 370/464 |
| 5,826,030 | 10/1998 | Hebert | 709/228 |
| 5,862,160 | 1/1999 | Irvin et al. | 371/53 |
| 5,895,462 | 4/1999 | Toki | 707/3 |

FOREIGN PATENT DOCUMENTS

| | | | |
|---|---|---|---|
| 0453937 | 10/1991 | European Pat. Off. | H04N 5/50 |
| 0601553 | 6/1994 | European Pat. Off. | H04N 7/20 |

OTHER PUBLICATIONS

Bungum, O.W., "Transmultiplexing, Transcontrol and Transscrambling of MPEG–2/DVB Signal", *Conference Record*, IEEE International Broadcasting Convention, 288–293 (Sep. 12–16, 1996).

Hartwig, S., et al., "Broadcasting and Processing of Program Guides for Digital TV", *SMPTE Journal*, 727–732 (Oct. 1997).

*Primary Examiner*—Jean R. Homere
*Attorney, Agent, or Firm*—Schwegman, Lundberg Woessner & Kluth P.A. & Anthony Claiborne

[57] ABSTRACT

A computer system has a large number of media input sources selectively coupled to a single presentation device. A device database tracks characteristics and connections of the input sources. Multiple, possibly conflicting, channels are assigned to a set of mutually distinct logical channel designations in a channel-map database. Program events occurring on the channels reside in a guide database.

27 Claims, 7 Drawing Sheets

FIG. 4 — 400 {340}

| | 421 | 422 | 423 | 424 | |
|---|---|---|---|---|---|
| | EVENT ID | TITLE | SOURCE | CHANNEL | START TIME |
| 411 | 234 | MAD ABOUT YOU | DBS | 156 | 0117-1900 |
| 412 | 789 | MAD ABOUT YOU | ANT | 4 | 0117-2000 |
| 413 | 1044 | MAD ABOUT YOU | CABLE | 156 | 0117-2000 |

| | 521 | 522 | 523 | 524 |
|---|---|---|---|---|
| | DEVICE NAME | INPUT | TUNE | SOURCE |
| 511 | RF TUNER | V1 | YES | ANTENNA |
| 512 | VCR1 | V2 | YES | ANTENNA |
| 513 | INTERNAL DBS | V3 | YES | DISH |
| 514 | INTERNAL DBS | V4 | YES | ANTENNA |
| 515 | VCR2 | V5 | YES | CABLE |

510 → 520

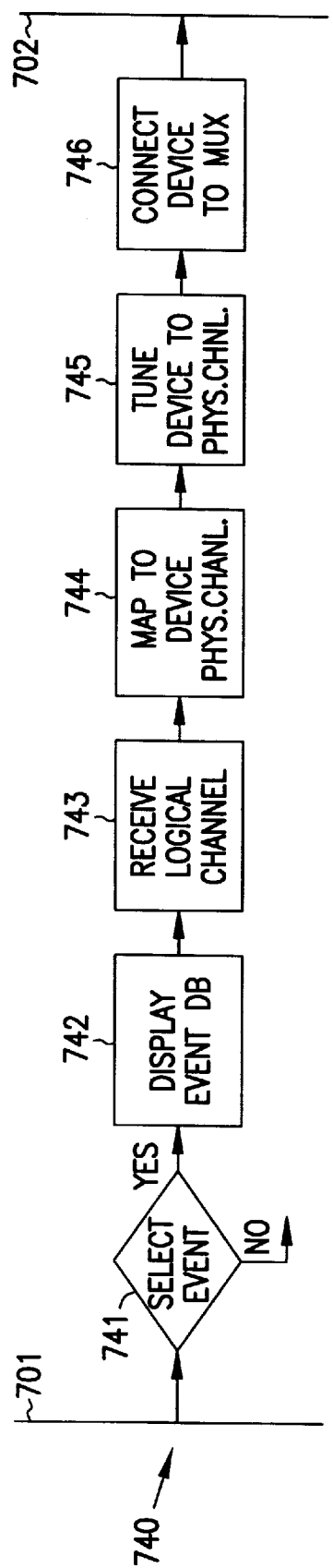

METHOD AND MANAGING MULTIPLE CHANNEL MAPS FROM MULTIPLE INPUT DEVICES IN A MULTIMEDIA SYSTEM

RELATED APPLICATIONS

This application is related to the co-assigned and co-filed applications, "Method and system for associating web sites to television program and having U.S. Ser. No. 09/002,580 filed Jan. 5, 1998," "System for time-shifting events in a multi-channel convergence system and having U.S. Ser. No. 09/002,990 filed Jan. 5, 1998," "Individualized parameter control for multiple media sources in a data processing system and having U.S. Ser. No. 09/002,972 filed Jan. 5, 1998," "System for combining electronic program guide data and having U.S. Ser. No. 09/002,584 filed Jan. 5, 1998," "System for scheduled caching of in-band data services and having U.S. Ser. No. 09/002,944 filed Jan. 5, 1998," "Integration of Internet sources into an electronic program database list," "Previous, favorite, and frequent channel management system," "System, apparatus, and method for tuning a television to a selected channel," "System for resolving channel selection in a multi-channel system," and "A system for managing favorite channels," all of which are hereby incorporated by reference.

BACKGROUND OF THE INVENTION

The present invention relates to electronic data processing, and more particularly concerns the identification, selection, and presentation of media signals from multiple channels of multiple media sources in a multimedia system.

Personal computers are evolving in several different directions. One of those directions leads toward a larger system including multimedia inputs from many different sources, presented to a user—or a group of users simultaneously—through a set of system output devices which have a configuration similar to that of an entertainment center or a home theater. This type of personal computer converges the capabilities of previously separate systems into a single system having greater capabilities than any of the separate systems, and at the same time reduces cost by eliminating the duplication of components providing the same function in the separate systems. An example of such a "converged system" is the publicly available Destination® PC/TV system from Gateway 2000. This product permits a user to enjoy the capabilities of both a personal computer system and a high-quality television system at a lower total cost than that of two separate systems.

One of the advantages of a convergence system is the availability of enough computing power to integrate many media input devices, such as direct-broadcast satellite receivers, compact disc and digital video disc players, video cassette recorders, and cameras, and to control their functions from a central point. Moreover, the programmability of a computer permits a system to be built up and configured to the individual tastes of each user, and to allow the media devices to interact with each other as the user wishes. Another potential capability involves employing on-line programming guides to set up and schedule events, such as recording a particular satellite show on a cassette recorder, then playing it back at a specified time.

In order to realize the advantages of convergence systems, it must be very easy for a relatively untrained user to add new features and devices, to prevent devices from interfering with each other, and to present consistent interfaces for all features and devices.

One of the problems in meeting these goals is that individual media sources such as satellite, cable, and off-the-air television each have multiple channels, and their channels are numbered or otherwise designated without regard for the designations of channels in the other services. Each service has its own, incompatible "channel map." Thus, for example, merely specifying channel '156' may be ambiguous between a local cable provider and a satellite service.

SUMMARY OF THE INVENTION

The present invention advances the flexibility and configurability of converged computer systems. It provides a method for managing multiple channel maps from different input devices within a single system. The invention provides a modular facility which provides a device database of characteristics and system connections for each media source or device. It accepts a set of channel designations from each device and automatically translates or remaps them into a set of logical channels unique within the system. Another aspect of the invention integrates on-line programming guides or listings for multiple services by mapping their entries to the logical channels. Presentation of listings or combinations of listings to a user thus insures that selections are carried out correctly, despite possible duplications in channel designations. Additional aspects of the invention involve particular data structures for recording device, event, and channel-map data.

Further aspects and features of the invention, as well as variations obvious to those of ordinary skill in the art, will appear from the following description of a preferred embodiment thereof.

BRIEF DESCRIPTION OF THE DRAWING

FIG. 4 shows the structure of the guide database of FIG. 3.

FIG. 5 shows the structure of the device database of FIG. 3.

FIG. 7, comprising FIGS. 7A and 7B, is a flowchart of a method for constructing the channel-map database of FIG. 6.

DETAILED DESCRIPTION

The following detailed description refers to the accompanying drawing which forms a part hereof, and which shows by way of illustration specific preferred embodiments in which the invention may be practiced. These embodiments are described in sufficient detail to enable those skilled in the art to practice the invention. Other embodiments may be employed, and logical, mechanical and electrical changes may be made without departing from the spirit and scope of the present invention. The following detailed description is, therefore, not to be taken in a limiting sense; rather, the scope of the invention is defined only by the appended claims.

Figure 1:
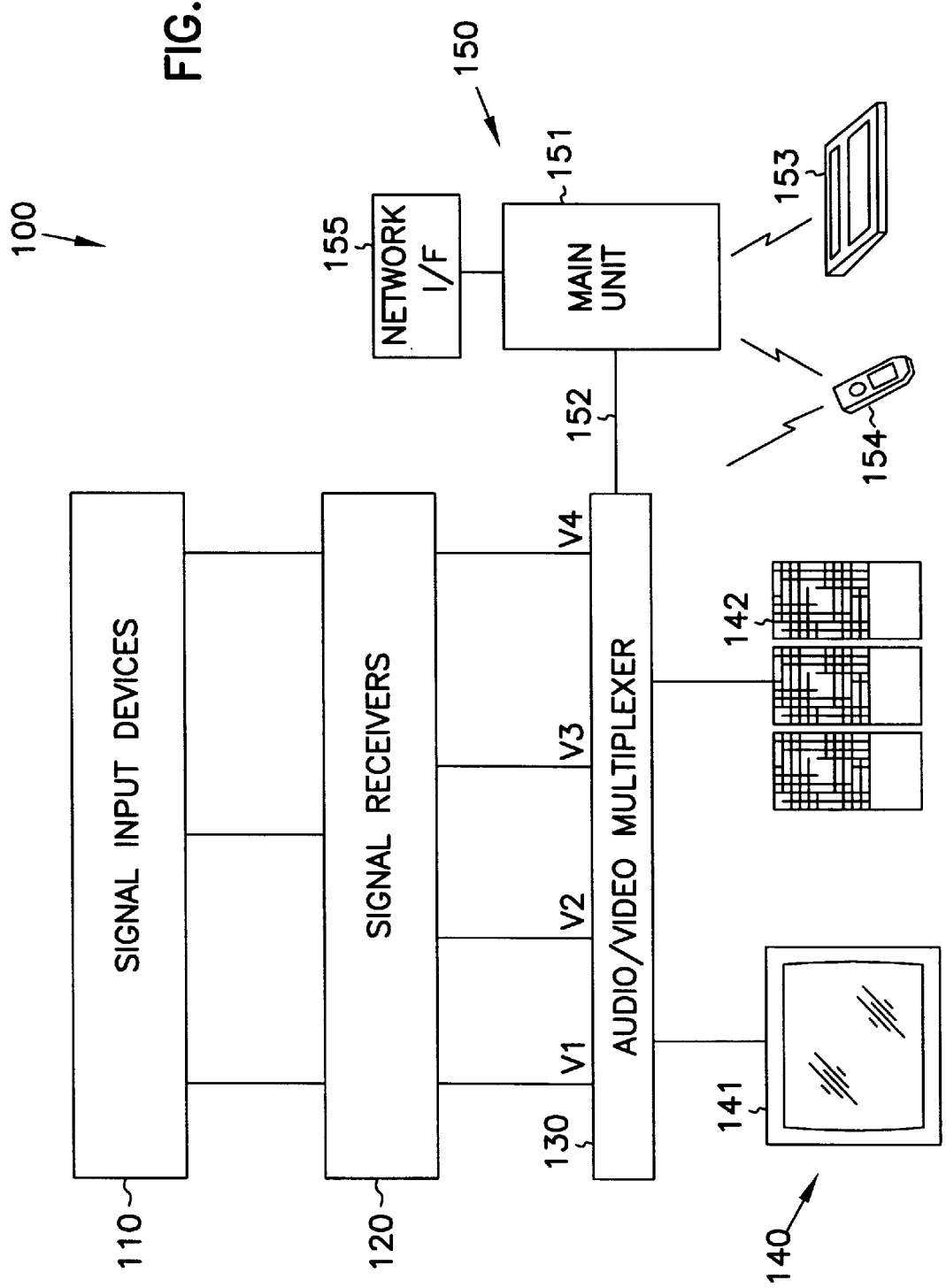
FIG. 1 is a high-level block diagram of the hardware of a system serving as an environment for the present invention.

FIG. 1 shows the hardware of a convergence system 100 that serves as an environment for the present invention. A number of signal-capture devices 110 intercept media signals from a number of sources. For example, a VHF/UHF antenna may receive off-the-air RF television signals, a satellite dish may receive direct-broadcast satellite (DBS) services in the gigahertz range, a cable connection box may receive commercial wired cable transmissions, and a modem may receive digitized images and sounds. Other conventional signal sources may be accommodated as well. Standard signal receivers 120 convert the raw media signals into forms suitable for storage, for presentation to a user, or for other purposes. For example, a television tuner may convert the RF signal from an antenna to baseband audio and video (A/V) signals for real-time display. The channel map for off-the-air TV channels are numbers from '2' to '69'. A video cassette recorder (VCR) may store A/V signals derived from an antenna for later playback. VCRs have no channels, unless they are connected to a signal source such as an antenna. A DBS modem may demodulate satellite signals from a dish antenna; many such modems can also process RF TV signals. Satellite services commonly employ a map or set having channel numbers above '100'. A VCR may also receive and store cable-TV signals from a connection box. Again, many other types of known and future signal receivers 120 may be coupled to system 100; some of them may be physically located within a personal computer system 150. Conventional control functions for these devices may be achieved by wired interfaces such as those described in the IEEE-1394 standard, or by wireless means such as infrared or RF.

An audio/video multiplexer 130 couples to receivers 120 and selects one of their output media signals; it may be physically located in computer system 150, in a television receiver, in a set-top box, or in any other convenient place. The selected output media signal is presented to a user on an output subsystem 140 such as output device 141, which is, for example, a large, high-quality video monitor capable of displaying standard TV signals, satellite or HDTV (high-definition television), and character/image data from a computer system 150. Sound system 142 preferably includes a multichannel amplifier and a set of loudspeakers of the "home theater" type. Although multiplexer 130 normally selects one source for presentation on the output devices, it may also be capable of selecting and mixing signals from multiple signal receivers 120, including signals from computer system 150.

A programmable digital processing system 150 may, for example, include the components and functions of a conventional personal computer (PC). In a convergence system, however, the main unit 151 may be physically located at a greater distance from output devices 140 than is the case for a desktop or business PC, and coupled thereto by a wired or wireless connection 152 through multiplexer 130. That is, a convergence system treats PC 150 as only one of a number of more or less equal signal sources for presentation devices 140. Main unit 151 may transmit control commands, as well as A/V data, to multiplexer 130. Also, a convergence system usually couples input devices such as keyboard 153 and pointing device 154 to the main unit through a wireless interface, either RF or infrared, rather than by wires. Pointing device 154 usually takes the form similar to that of a TV remote, and includes a trackball or other means that can be operated independently of a work surface. In some cases, device 154 might control multiplexer 130 directly, and could even perform some of the functions described in connection with system 151. Computer 150 further includes a standard network interface 155 such as a data modem for connection to providers of on-line services, local-area networks, and the like.

Figure 2:
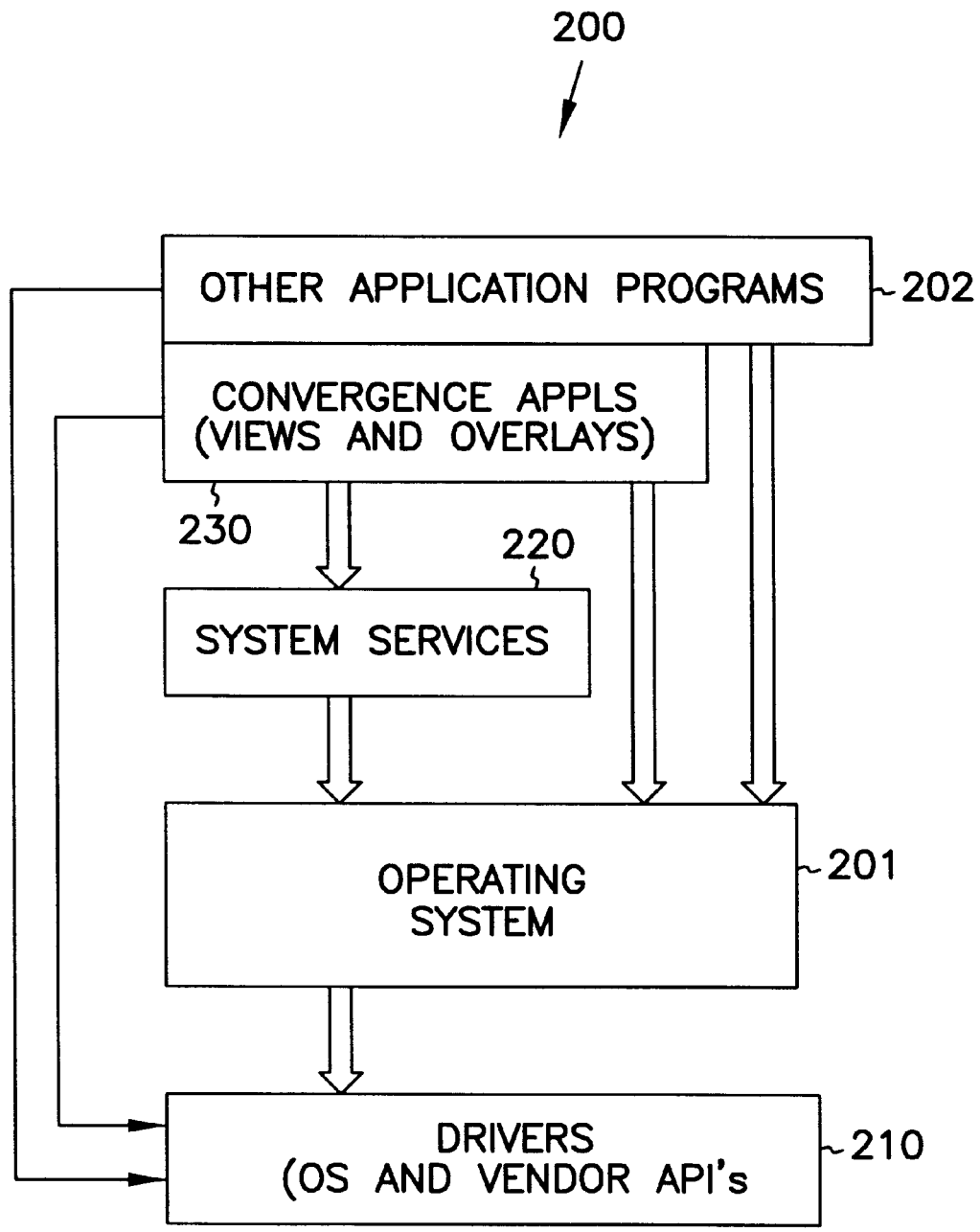
FIG. 2 is a block diagram of a software architecture for the system of FIG. 1.

FIG. 2 is an overview of a preferably software architecture 200 for providing convergence functions in system 100, FIG. 1. Commonly assigned application entitled "Architecture for Convergence Systems and having U.S. Ser. No. 09/002,828 filed Jan. 15, 1998," filed on even date herewith and hereby incorporated by reference herein, describes this architecture in greater detail.

For the present purpose, it is sufficient to note that driver layer 210 contains a number of modular drivers of conventional construction for controlling the system hardware 100, and for interfacing to functions of a conventional operating system such as Microsoft® Windows95®. Drivers represent the lowest level of abstraction of a software architecture, and include application programming interfaces (APIs). A services layer 220 of modular system services provides a higher level of abstraction. System services interface with drivers to provide frequently used functions such as scheduling events for receivers 120, entering and enforcing parental-control restrictions, and storing "favorite place" information for users. The present invention creates services at this level. User-interface layer 230 provides a number of modules allowing a user to interact with components in both services layer 220 and driver level 210. For example, an interface could provide facilities for a user to enter or update specific items in a parental controls service. "View" interfaces generally comprise full-screen interfaces covering multiple related functions, such as a TV View for programing and controlling media receivers 120, and a PC View providing a desktop for executing application programs 202 from processing system 150. "Overlays" are mostly not independent interfaces; rather, they cooperate with and extend view interfaces. Overlays primarily provide contextual information and means for navigating a hardware facility.

Figure 3:
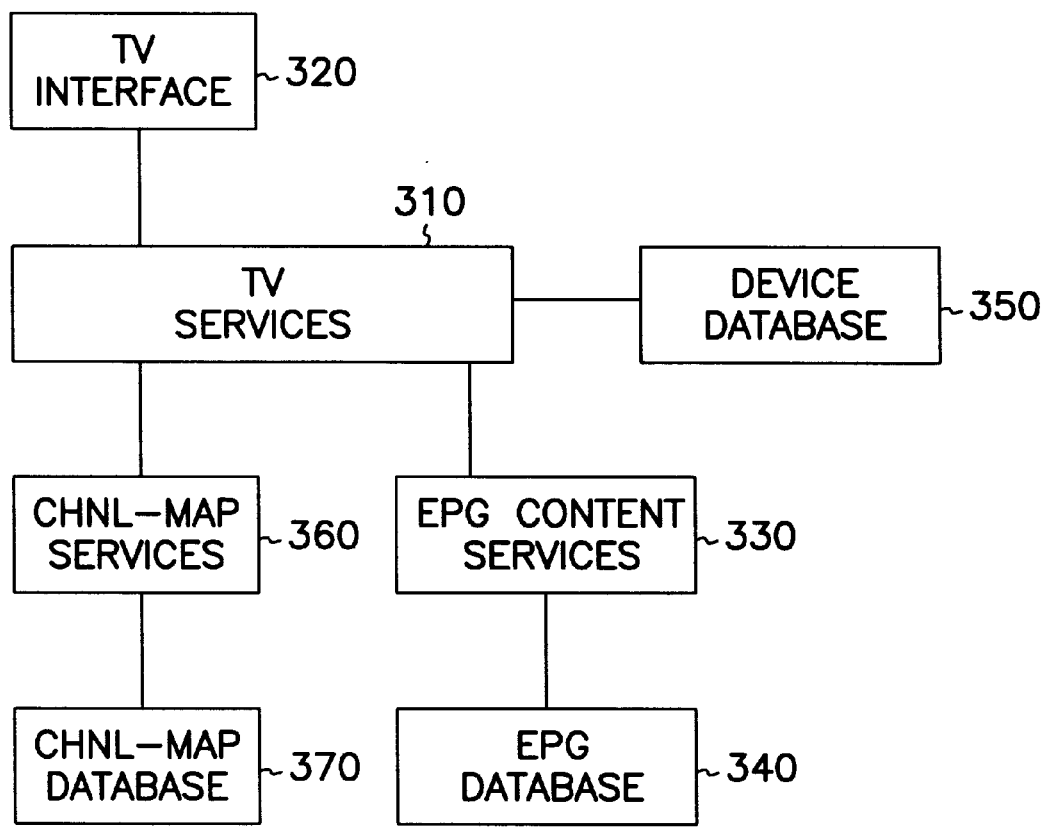
FIG. 3 is a block diagram of portions of the system of FIGS. 1 and 2 that participate in the present invention.

FIG. 3 is a block diagram of portions of the system of FIGS. 1 and 2 that participate in the channel-mapping function of software 200 for system 100.

TV-services module 310, one of the services in layer 220, controls multiplexer 130 to select among input devices 120 for presentation on output devices 140, and controls the selected device to tune to a particular channel on that device. Device selection and channel tuning may occur in response to a contemporaneous user selection of a specific event on a particular channel of a particular device via a TV-view interface 320 in architecture layer 230. The interface employs EPG ("electronic program guide") content-services module 330 to present choices of events. (Other sources, such as an application program 202 running on PC 150, may also interface with TV-services module 310 for this purpose.)

EPG module 330 provides a function for recording and organizing programs or other events available from media devices 120. Although the internal operation of module 330 is not relevant here, an understanding of its overall functions is helpful. Some media sources provide in-band guides for their programming. For example, DBS modem 112 continually receives signals representing broadcast information as to what events will occur on particular tunable satellite channels at specific times. Other companies—some of which themselves provide media and some of which do not—furnish out-of-band program guides in electronic form. For example, a user may subscribe to electronic program listings transmitted periodically over the Internet and received into system 100 via network interface 155, which may be a modem or similar device. EPG module 330 integrates and stores electronic program guides into a database 340. FIG. 4 illustrates a structure 400 for storing this information. A set 410 of records have columns 420 for storing information including a unique event identifier 421, a title 422, a designation 423 of the source providing the event, the physical channel 424 within source 423, and a start time and date for the event; other information may be kept in database 340 as well. In FIG. 4, records 411–413 show a single TV show available from three different sources at two different times. Record 411 indicates that the show is broadcast on a channel that DBS service 123 identifies as '156'. The program starts at 7 pm on September 17. Record 412 specifies a broadcast of this show on VHF TV channel '4' an hour later. Record 413 logs the show at the same time on a local cable service. The cable channel designation, '156' is—strictly coincidentally—the same as that for the DBS broadcast in record 411.

Module 310 stores information about media input devices connected to system 100 in a device database 350. FIG. 5 describes a structure 500 for this database. A set 510 of records includes columns 520 for storing certain characteristics of each device. Column 521 holds a device name by which the system knows each connected receiver 120. Column 522 specifies the input 522 to which that device is coupled. Column 523 contains a flag indicating whether or not the device is tunable, i.e., has multiple channels. Column 524 includes an identifier naming the source 110 of its signals. For example, record 511 asserts that RF tuner 121 feeds input V1 of multiplexer 130 in FIG. 1, that it is tunable to different channels, and that RF antenna 111 sources its signals. A single receiver device may possess more than one record; records 513 and 514 both name DBS modem 123, but indicate that, like most satellite receivers, it can be connected to a local-channel source 111 as well as to its own dish 112. The structure 500 of database 350 permits multiple sources, allows any combination of tunability, and admits more than one input connection for any device. Other information may be recorded if desired. The database structure may comprise a simple table or a more complex entity.

Figure 6:
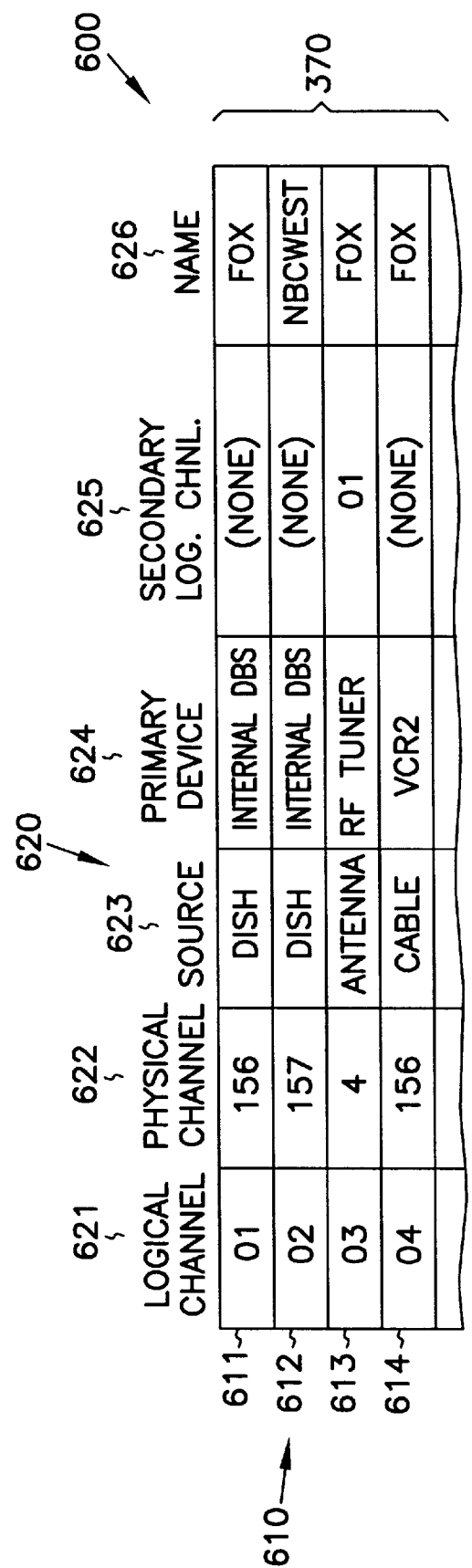
FIG. 6 shows the structure of the channel-map database of FIG. 3.

Channel-mapping services module 360 builds, maintains, and reads a channel-map database 370 for module 310. FIG. 6 shows a structure 600 for database 370. A set 610 of individual records 611–614 includes columns for designating independent logical and physical designations 621 and 622 for the same channel, for specifying a signal source 623 for that channel, and for naming a primary device 624 for receiving the channel into multiplexer 130, FIG. 1. Logical channel numbers—or other designations—621 are unique within system 100, and have no necessary relation to physical channels, transmission channels, or any other designation employed by their source. They create a linear name space across the entire system. The user, however, never need be aware of channel 621; interface 320 preferably displays only the physical channel designation 622 to the user. Module 320, of course, must use the physical channel number 622 for tuning a selected device. (Satellite receivers commonly convert their physical channel numbers internally to another set of transmission channels.) Column 623 designates a source 110 for the logical channel. Column 624 names one of the receiver devices 120 as the primary device for receiving the logical channel, the one that is normally preferred by the user. Column 625 names one or more secondary source for the same signal. For example, the RF tuner primary device in record 613 could be unavailable for some reason; column 625 specifies that the signal from physical channel '4' of the RF tuner is also obtainable on logical channel '01'—that is, on physical channel '156' of the satellite dish. A comparison of records 611 and 614 demonstrates that two channels having the same physical designation, '156', have different logical designations, '01' and '04'. Database structure 600 may also include a name for presentation to the user, in column 626. Thus, for example, the name "Fox" can be displayed for any of the logical channels in records 611, 612, and 614, which all represent a Fox® network station. The entries in column 626 have no fixed significance; they may represent a source name from a program guide, an arbitrary designation entered by the user, or any other information. Database 370 may include additional columns containing further information concerning each logical channel. The form of database 370 may vary from a simple table or list in memory to a complex application; its implementation is not material to the invention.

Figure 7A:
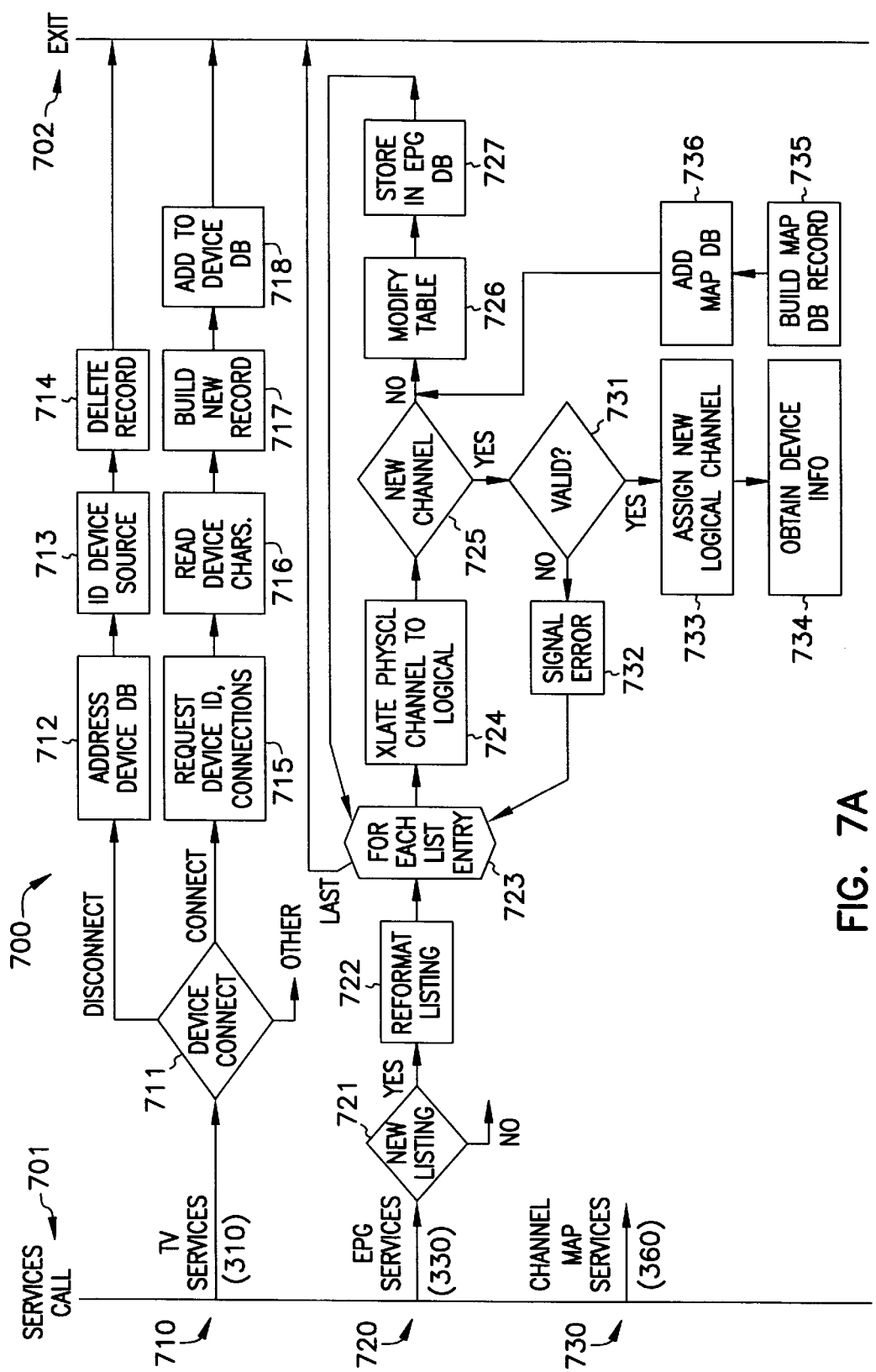

FIG. 7 describes the operation 700 of the invention within the architecture 300, FIG. 3.

When the connection of an input device 120 to a signal source 110 or to multiplexer 130 changes, a user employs a user interface 320 to call TV-services module 310, at 710 in FIG. 7. If a device is disconnected from a source or from a multiplexer input, step 711 causes step 712 to access the device database 350. Step 713 receives an identification of the particular connection that has been broken. Step 714 deletes the record specifying that connection, and passes control to exit the service. When a new connection is made, step 711 executes step 715, which requests the user to identify the device 120, its port number in multiplexer 130, and its source 110. Step 716 may then read a number of characteristics from the device itself, such as whether it is capable of tuning multiple channels. Step 717 then builds a new record containing the information in columns 520, FIG. 5. Step 718 adds the record to device database 350, and passes control to exit 702.

The arrival of a new event listing from an in-band or out-of-band on-line provider initiates a call to EPG services module 330 at 720 in FIG. 7. Step 721 detects the listing, and step 722 reformats its entries if necessary. For each event record in the listing, step 723 causes step 724 to translate the physical channel in the listing to the equivalent logical channel. Because the combination of device and physical channel is unique, this translation may be accomplished by accessing map database 370 using columns 622 and 624 as a composite key, then extracting the value of column 621. If step 725 determines that the current device/physical-channel combination is already present in database 370, then step 726 builds a new event record from the listing information and the logical channel designation, step 727 stores the record, and control returns to step 723 to process the next record in the listing.

If step 725 detects a device/physical-channel key that is not present in database 370, it calls channel-map services module 360, at 730 in FIG. 7. Step 731 first asks whether the device is valid: that is, whether the device name is present in the set of connected receivers 120, and, if so, whether the listing channel can be tuned by that device. If the list channel is invalid, step 732 signals an error and returns to step 723. For a valid new channel, step 733 assigns a new logical channel number, one which is distinct from all the channel numbers in column 621. Step 734 then accesses device database 350 in order to obtain the remaining information required for a map-database record. Step 735 builds the new record, and step 736 adds it to the channel map database 370. Control then returns to EPG services module at step 726, to build an E.G. record for the current event on the new channel.

Although specific embodiments have been illustrated and described herein, those of ordinary skill in the art will appreciate that any elements or arrangements of elements capable of achieving the same purpose may be substituted for the specific forms shown. This patent is intended to cover all adaptations or variations of the invention, limited only by the following claims and equivalents thereof.

I claim:

1. A method, performed in an electronic data-processing system, for managing a plurality of channel maps, each channel map associated with a different media source, and each channel map including a plurality of physical channels, each having a physical channel designation, the method comprising:

receiving a plurality of physical channel designations from at least two media sources;

translating each of said received physical channel designations from all of said at least two sources to a separate logical channel designation, each logical channel designation being distinct from any other logical channel designation over all of said media sources and physical channels;

constructing a record for each of said logical channel designations, said record including the matching physical channel designation which was translated to said logical channel designation and including an identification of the media source from which the translated physical channel designation was received; and assembling a channel-map database comprising a plurality of said records.

2. A method, performed in an electronic data-processing system, for managing a plurality of channel maps, each channel map associated with a different media source, and each channel map including a plurality of channels, each channel having a physical channel designation, the method comprising:

receiving a plurality of physical channel designations from at least two media sources, wherein said receiving step comprises:

receiving a guide, the guide listing multiple events, each event associated with one of said physical channel designations and one of said media sources; and extracting said physical channel designations and said media sources for each event listing in said guide;

translating said received physical channel designations to a plurality of logical channel designations, each logical channel designation being distinct from any other logical channel designation;

constructing a record for each of said logical channel designations, said record including the matching physical channel designation which was translated to said logical channel designation and including an identification of the media source from which the translated physical channel designation was received; and assembling a channel-map database comprising a plurality of said records.

3. A method according to claim 2, wherein said guide is an in-band guide received directly from one of said media sources.

4. A method according to claim 2, wherein said guide is an out-of-band on-line guide received electronically from a source other than one of said media sources.

5. A method, performed in an electronic data-processing system, for managing a plurality of channel maps, each channel map associated with a different media source, and each channel map including a plurality of channels, each channel having a physical channel designation, the method comprising:

receiving a plurality of physical channel designations from at least two media sources;

translating said received physical channel designations to a plurality of logical channel designations, each logical channel designation being distinct from any other logical channel designation, wherein said translating step comprises:

comparing a first of said physical channel designations to said channel-map database;

determining whether said physical channel designation is present in said channel-map database;

if said physical channel designation is present in said channel-map database, repeating said comparing and determining steps for the next physical channel designation, until all physical channel designations have been processed; and if said physical channel designation is not present in said channel-map database, carrying out said translating, constructing, and assembling steps for said physical channel designation;

constructing a record for each of said logical channel designations, said record including the matching physical channel designation which was translated to said logical channel designation and including an identification of the media source from which the translated physical channel designation was received; and assembling a channel-map database comprising a plurality of said records.

6. A method according to claim 5, wherein different media sources have channel maps containing different sets of physical channel designations.

7. A method according to claim 1, wherein said constructing step comprises:

obtaining a predetermined characteristic of each said media source; and including said predetermined characteristic in said record.

8. A method according to claim 7, wherein multiple characteristics of each said media source are obtained and included in said record.

9. A method according to claim 7, wherein said characteristic is obtained from a device database within said electronic data-processing system.

10. A method according to claim 1, wherein said assembling step comprises adding new records sequentially to said channel-map database.

11. A method according to claim 1, further comprising:

constructing a device database comprising a set of characteristics for each of said media sources, one of said characteristics being said identification of said media source; and including at least one of said characteristics in addition to said identification in each said record.

12. A method, performed in an electronic data-processing system, for managing a plurality of channel maps, each channel map associated with a different media source, and each channel map including a plurality of channels, each channel having a physical channel designation, the method comprising:

receiving a plurality of physical channel designations from at least two media sources;

translating said received physical channel designations to a plurality of logical channel designations, each logical channel designation being distinct from any other logical channel designation;

constructing a record for each of said logical channel designations, said record including the matching physical channel designation which was translated to said logical channel designation and including an identification of the media source from which the translated physical channel designation was received;

assembling a channel-map database comprising a plurality of said records;

constructing a device database comprising a set of characteristics for each of said media sources, one of said characteristics being said identification of said media source, wherein constructing said device database comprises:

receiving source information for each of said media sources, said source information including said identification of said media source, connection data specifying the connection of said media source to said system, and at least one further characteristic for said media source; and including at least some of said source information in addition to said identification in each said record; and including at least one of said characteristics in addition to said identification in each said record.

13. A data structure for a data processing system for managing a plurality of channel maps, each channel map associated with a different media source, and each channel map including a plurality of channels, each channel having a physical channel designation, the data structure comprising:

a plurality of rows, each row including a logical channel designation, each logical channel designation being distinct from any other logical channel designation, a physical channel designation related to said logical channel designation, and an identification of the media source for said physical channel designation;

a first column containing said logical channel designation;

a second column containing said physical channel designation;

a third column containing said media source identification;

a fourth column containing a primary media input device associated with said media source;

a fifth column containing a secondary logical channel designation associated with said logical channel designation in said first column; and a sixth column containing human-readable information for said logical channel designation.

14. A method for managing multiple information channels from multiple input devices in a multimedia system, comprising:

reading a plurality of physical channel designations associated with a plurality of physical channels received from each of said input devices, said physical channel designations being not necessarily unique across all of said input devices;

mapping each of said physical channel designations to a logical channel designation, each logical channel designation differing from all other logical channel designations across all of said input devices; and retrieving one of said physical channels using said logical channel designation.

15. A method according to claim 14, wherein each of said input devices is coupled to a source of media input signals.

16. A method according to claim 14, further comprising:

recording a record for each of said logical channel designations, said record including the physical channel designation mapped to said logical channel designation and including an identification of the input device from which said physical channel designation was received.

17. A method according to claim 16, further comprising assembling a table including all of said records.

18. A method, performed in an electronic data-processing system, for managing multiple channel maps from multiple media sources in a multimedia system, comprising:

receiving a plurality of channel maps, each of said maps including a plurality of designations associated with a corresponding plurality of physical channels all associated with one of said media sources;

assembling a database of records from all of said channel maps, each of said records including one of the physical-channel designations from one of said sources, an identification of said one media source, and a logical channel designation, said logical channel designation being unique across all of said physical channel designations in all of said maps.

19. A method according to claim 18, wherein said receiving step includes:

receiving a guide, the guide listing multiple events, each event associated with one of said physical channel designations and one of said media sources; and extracting said physical channel designations and said media sources for each event listing in said guide.

20. A method according to claim 18, wherein said assembling step includes:

obtaining a predetermined characteristic of each said media source; and including said predetermined characteristic in said records.

21. A method according to claim 20, wherein multiple characteristics of each said media source are obtained and included in said records.

22. A method according to claim 20, wherein said characteristic is obtained from a device database within said electronic data-processing system.

23. A method according to claim 18, wherein said assembling step comprises adding new records sequentially to said channel-map database.

24. A method according to claim 18, further comprising:

constructing a device database comprising a set of characteristics for each of said media sources, one of said characteristics being said identification of said media source; and including at least one of said characteristics in addition to said identification in each of said records.

25. A data structure for a data processing system for managing a plurality of channel maps, each channel map associated with a different media source, and each channel map including a plurality of physical channels each having a physical channel designation that is not necessarily unique across all of said media sources, the data structure comprising a single structure for all of said channel maps, said structure having plurality of rows, each row including:

one of said physical channel designations;

an identification of one of said media sources associated with said one physical channel designation; and a designation of a logical channel corresponding to both said one physical channel designation and said one media source, said logical channel designation being distinct across the combination of all of said sources and all of said physical channel designations.

26. A data structure according to claim 25, further including a primary media input device associated with said one media source.

27. A data structure according to claim 26, further including a designation of a secondary logical channel associated with said logical channel designation.

* * * * *